US012363471B2

(12) United States Patent
Gauger, Jr. et al.

(10) Patent No.: US 12,363,471 B2
(45) Date of Patent: Jul. 15, 2025

(54) DYNAMIC SEAL TESTING AND FEEDBACK FOR AUDIO WEARABLE DEVICES

(71) Applicant: BOSE CORPORATION, Framingham, MA (US)

(72) Inventors: Daniel M. Gauger, Jr., Berlin, MA (US); Janet L. Xu, Merced, CA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 17/326,839

(22) Filed: May 21, 2021

(65) Prior Publication Data

US 2022/0377449 A1 Nov. 24, 2022

(51) Int. Cl.
*H04R 1/10* (2006.01)
*H04R 25/00* (2006.01)

(52) U.S. Cl.
CPC ......... *H04R 1/1041* (2013.01); *H04R 1/1016* (2013.01); *H04R 25/30* (2013.01); *H04R 2460/15* (2013.01)

(58) Field of Classification Search
CPC .. H04R 1/1041; H04R 1/1016; H04R 1/1083; H04R 25/30; H04R 25/305; H04R 25/45; H04R 25/453; H04R 25/505; H04R 2460/01; H04R 2460/15
USPC ................................... 381/60, 317, 56, 71.6
See application file for complete search history.

(56) References Cited

U.S. PATENT DOCUMENTS

2008/0137873 A1* 6/2008 Goldstein ............ H04R 1/1083 381/57
2011/0116643 A1* 5/2011 Tiscareno .............. H04R 5/033 381/380
2020/0162808 A1* 5/2020 Monsarrat-Chanon ...................... H04R 1/1083
2021/0014613 A1* 1/2021 Carrigan .............. H04R 1/1016

FOREIGN PATENT DOCUMENTS

| | | | |
|---|---|---|---|
| DE | 102020117780 | A1 | 1/2021 |
| JP | 2016015585 | A | 1/2016 |
| JP | 2019062342 | A | 4/2019 |
| WO | 2021235117 | A1 | 11/2021 |

OTHER PUBLICATIONS

International Search Report and Written Opinion for International Application No. 1 PCT/US2022/025681 Mailed Jul. 27, 2022.

* cited by examiner

*Primary Examiner* — Ahmad F. Matar
*Assistant Examiner* — Sabrina Diaz
(74) *Attorney, Agent, or Firm* — Patterson + Sheridan, LLP

(57) ABSTRACT

The present disclosure provides processes, methods, systems, and devices for providing a feedback of a wearable device to a user. The feedback may indicate a level of seal, fitness, or compatibility between the wearable device and the user. For example, the feedback provides an exact measurement and a quantified report regarding how well a seal is created when the user puts on the wearable device that dictates the wearable device's audio playback performance experienced by the user. This allows the user to identify, in addition to the comfort level, a best adjustment or selection of components (e.g., tips, inserts, cups, or the like) of the wearable device to deliver the best audio performance achievable by the wearable device. The wearable device (Continued)

may include ear buds, headphones, headsets, or any audio device physically contacting the user.

21 Claims, 5 Drawing Sheets

DYNAMIC SEAL TESTING AND FEEDBACK FOR AUDIO WEARABLE DEVICES

FIELD

Aspects of the disclosure generally relate to audio playback performance.

BACKGROUND

To enjoy audio anywhere, listeners want miniaturized, high fidelity, and responsive speakers with noise canceling capabilities. To fully deliver the audio performance as designed, such speakers are often inserted into the listeners' ears (e.g., in cases of earbuds) or completely covering the listeners' ears (e.g., in cases of headphones). To accommodate different sizes and shapes of the listeners' ears, accessories, such as tips, inserts, cups, or other sealing components are supplied so that the listeners may identify one with the most comfortable fit. In some cases, however, choosing the accessories based on the comfort level may not result in the best audio performance achievable with the speakers. For example, a listener may prefer a loose fit to avoid pressure feelings relative to the ears while such loose fit may have the speakers underperform. Currently, few quantifiable measures are available for the listeners to make an informed decision regarding the tradeoff between comfort and performance, identifying the best accessory to achieve both comfort and performance, or identifying the audio performance by accurate measurements. Accordingly, methods for testing and receiving feedback for listeners to know the achievable audio performance, as well as apparatuses and systems configured to implement these methods are desired.

SUMMARY

All examples and features mentioned herein can be combined in any technically possible manner.

Aspects of the present disclosure provide method for providing a feedback of a wearable device to a user. The method generally includes playing, via a speaker on the wearable device, an audio signal. The method further includes measuring, using a microphone on the wearable device, audio data associated with the audio signal. The wearable device is configured to be worn by a user such that the microphone shares a cavity with an ear canal of the user. The method includes providing feedback to the user regarding a seal quality of an interface of the wearable device to at least a portion of the user's head. The feedback is continually provided while i) the wearable device is moved relative to the user, ii) the audio signal played via the speaker is changed, or iii) both the wearable device is moved relative to the user and the audio signal played via the speaker is changed.

In aspects, providing the feedback comprises providing a visual response.

In aspects providing the feedback comprises providing an audio response via the speaker on the wearable device.

In aspects, the placement of the flexible coupling element relative to the ear includes at least a position or an orientation of the flexible coupling element relative to the at least one of the user's ears. In some case, the speaker on the wearable device and the internal microphone are placed inside the ear of the user. The audio data measured by the internal microphone may include a low frequency response indicating a level of seal between the speaker and the ear of the user, wherein the low frequency response comprises at least one of a magnitude response or a phase response.

In some cases, the method further includes indicating a fit quality index when the level of seal between the speaker and the ear of the user is within a calibrated range. In some cases, the method further includes actively canceling, via the speaker, ambient noises when the fit quality index is above a threshold value.

In aspects, the method further includes generating the audio signal based on a profile of frequency variations to invoke the low frequency response.

Aspects of the present disclosure provide a wearable device configured to be worn by a user such that a microphone of the wearable device shares a cavity with an ear canal of the user. The wearable device includes at least one speaker configured to play an audio signal to the user. The wearable device includes the microphone adjacent to the at least one speaker. The microphone is configured to measure audio data associated with the audio signal played by the at least one speaker. The wearable device further includes a processor configured to process the audio data to dynamically determine, in a closed-loop, a feedback regarding a seal quality of an interface of the wearable device to at least one of the user's ears. The feedback is continually provided while i) the wearable device is moved relative to the user, ii) the audio signal played via the speaker is changed, or iii) both the wearable device is moved relative to the user and the audio signal played via the speaker is changed. The processor is further configured to output the feedback to the user.

In aspects, the wearable device further includes a visual indicator configured to provide a visual indication of the feedback to the user.

In aspects, the feedback is at least played by the at least one speaker.

In aspects, the placement of the wearable device includes at least a position or an orientation of the flexible coupling element relative to the at least one of the user's ears.

In aspects, the speaker on the wearable device and the internal microphone are placed inside the ear of the user. In some cases, the audio data measured by the internal microphone includes a low frequency response indicating a level of seal between the speaker and the ear of the user, wherein the low frequency response comprises at least one of a magnitude response or a phase response. In some cases, the feedback comprises a fit quality index indicating when the level of seal between the speaker and the ear of the user is within a calibrated range.

In aspects, the at least one speaker is further configured to actively cancel, via the speaker, ambient noises when the fit quality index is above a threshold value.

In aspects, the processor is further configured to generate the audio signal based on a profile of frequency variations to invoke the low frequency response.

Aspects of the present disclosure provide a system including a wearable device and a playback device. The wearable device includes at least one speaker configured to play an audio signal to a user. The wearable device includes a microphone adjacent to the at least one speaker. The microphone is configured to measure audio data associated with the audio signal played by the at least one speaker. The wearable device further includes a processor configured to process the audio data to dynamically determine, in a closed-loop, a feedback regarding a seal quality of an interface of the wearable device to at least one of the user's ears. The feedback is continually provided while i) the wearable device is moved relative to the user, ii) the audio signal played via the speaker is changed, or iii) both the wearable device is moved relative to the user and the audio signal played via the speaker is changed. The processor is further configured to output the feedback to the user. The playback device is in communication with the wearable device and configured to receive the feedback.

In aspects, the playback device transmits the audio signal to the wearable device. Two or more features described in this disclosure, including those described in this summary section, may be combined to form implementations not specifically described herein.

The details of one or more implementations are set forth in the accompanying drawings and the description below. Other features, objects, and advantages will be apparent from the description and drawings, and from the claims.

BRIEF DESCRIPTION OF THE DRAWINGS

Like numerals indicate like elements.

DETAILED DESCRIPTION

Figure 1:
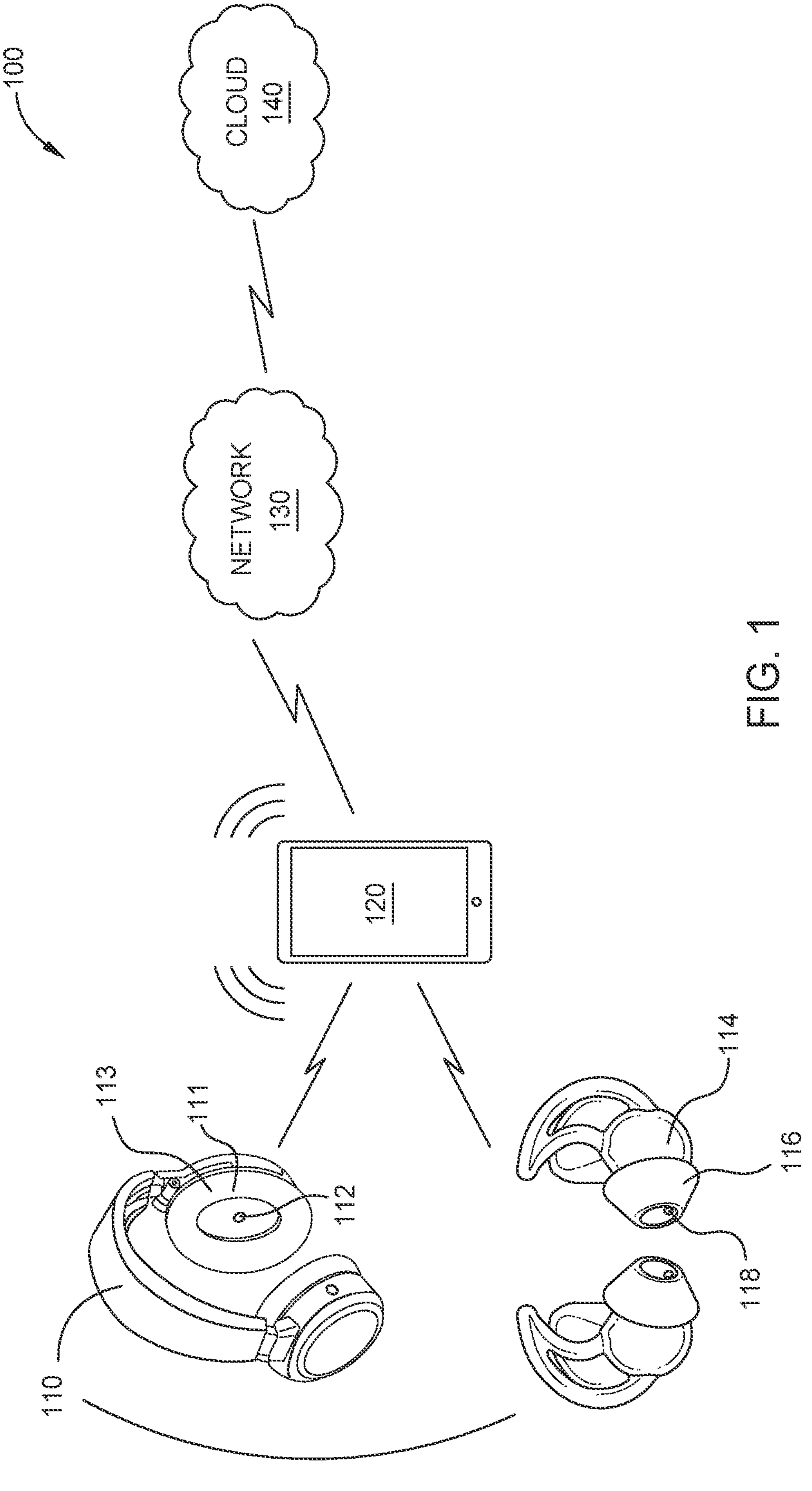
FIG. 1 illustrates an example system in which aspects of the present disclosure may be implemented.

The present disclosure provides processes, methods, systems, and devices for providing a feedback of a wearable device to a user. The feedback may indicate a level of seal, fitness, or compatibility between the wearable device and the user. For example, the feedback provides an exact measurement and a quantified report regarding how well a seal is created when the user puts on the wearable device that dictates the wearable device's audio playback performance experienced by the user. This allows the user to identify, in addition to the comfort level, a best adjustment or selection of components (e.g., tips, inserts, cups, or the like) of the wearable device to deliver the best audio performance achievable by the wearable device. The wearable device may include ear buds, headphones, headsets, or any audio device physically contacting the user.

In general, the techniques disclosed herein include playing an audio signal via a speaker on the wearable device. For example, the audio signal includes any audible sound waves produced by the speaker. The wearable device includes at least one internal microphone adjacent to the speaker and uses the internal microphone to measure audio data associated with the audio signal. Very often, the internal microphone is positioned in a space sealed by an interface of the wearable device and the user's ear. As such, the audio data measured by the internal microphone may include the audio signal and any reflection or propagation of the audio signal in the space sealed. In some cases, the internal microphone may be a microphone used for active noise cancellation.

Based on the audio data, the feedback may be provided to the user regarding the seal quality of the interface of the wearable device to the user's ear. The feedback may include a visual response and/or an audio response. The feedback dynamically changes, based on the interface of the wearable device to the user's ear as determined by at least one of an application of a flexible sealing coupling element (e.g., tip, insert, or cup) for the speaker or a placement of the flexible coupling element relative to the user's ear. The placement of the flexible coupling element may include a position or an orientation of the flexible coupling element relative to the user's ear. For example, when the flexible coupling element is a soft tip for ear buds, the user may insert the soft tip into the ear at different depth levels to create different placements, resulting in different seal qualities. Similarly, when the soft tip has asymmetrical shapes, orienting (i.e., rotating and angling in different directions) the soft tip in the ear results in different seal qualities. Replacing the soft tip with another one having different sizes, shapes, materials, or other properties results in different seal qualities as well.

Conventionally, multiple flexible coupling elements are provided with a wearable device. For example, ear buds come with flexible tips of different sizes, shapes, and flexibilities. Headphones come with cups of different materials and sizes, etc. Users often select one of the flexible coupling elements to use with the wearable device based on comfort level only. On the other hand, users have no reference for the audio or noise cancellation to expect and thus have no basis upon which to judge the seal quality. The present disclosure provides techniques for dynamically providing feedback on the seal quality, thus allowing the users to identify the flexible tips that provides an optimized comfort level and sound performance. For example, the continual feedback maybe provided at certain rate (e.g., a number of feedbacks provided per certain time period). As such, even though certain feedback may be presented discretely (e.g., one at a time) to the user, such feedback is still considered as continual feedback.

The present disclosure provides various benefits for providing feedback. In some cases, by giving users a simple and clear indication of the seal quality, users can factor the seal quality into their choice of flexible coupling elements. The selection of a proper flexible coupling element may meaningfully improve the audio performance achieved, for example, by the user selecting a better fitting coupling element, especially one that not just achieves a seal when well-positioned (e.g., in the ear) but which also provides a robust seal tolerant of jaw movement, exercise, etc. Because the techniques variously described herein provide dynamic feedback to a user regarding seal quality (e.g., based on a seal quality of an interface of a wearable device to at least a portion of the user's head, such as a portion of a user's ear), it allows the user to receive real-time feedback about the seal quality as the user adjusts the wearable device to different positions (i.e., as the wearable device is moved relative to the user) and/or when different audio signals are played to determine seal quality at different frequencies or with different sounds. For example, the techniques could be initiated as a user inserts an earbud into the user's ear. Before initiating insertion, there will be no seal and the feedback would indicate same. When the earbud is first inserted, the feedback could indicate that the seal is improving (e.g., using visual, audial, and/or haptic feedback at the wearable device and/or at a remote device connected to the wearable device). As the user completes the insertion, the seal should improve and the feedback would indicate same. However, even when the user has completed insertion of the earbud, the seal may not be provide a threshold audio performance and/or active/passive noise reduction properties, so the feedback could indicate same. This could prompt the user to adjust the fit of the earbud while receiving real-time feedback as to the fit quality of the earbud. In some cases, the fit may not pass a predetermined threshold due to the use of an improper ear tip and/or retention member for the earbud, and so the techniques could indicate to the user to try a different ear tip and/or retention member. In this manner, the techniques help inform users about seal quality and enable a user to experiment with the fit of the wearable device to help achieve a desired balance between seal quality, comfort, and stability. This is particularly beneficial for wearable devices having multiple configurations for fitting the device to a user, such as having different ear tips, retention members, ear-cups, ear cushions, ear hooks, and so forth (where the differences may be based on size, shape, and/or material, for example), as the techniques could use the measured seal quality to suggest switching to one or more of the different configurations for the wearable device (e.g., suggesting to use larger or smaller ear tips).

In some aspects, the wearable device may be paired with a playback device that is a computing device operable to play a multimedia document or a streamed broadcast. The wearable device may receive audio streams from the playback device. The wearable device may be paired with the playback device via a Bluetooth connection. The wearable device may include speakers and microphones. The speakers are configured to output the audio playback provided by the playback device. The microphones may be placed at various locations: some near the speakers and some placed to capture voices of the user. The microphones near the speakers may be used to capture feedback audio signals to determine the seal quality.

FIG. 1 illustrates an example system 100 in which aspects of the present disclosure are practiced. As shown, system 100 includes a wearable device 110 communicatively coupled with a playback device 120. The wearable device 110 is illustrated as either a set of ear buds or a headset. The wearable device 110 includes at least two speakers, one for each ear. One speaker 111 is shown on the headset and one speaker 114 is shown in the ear buds. The playback device 120 is illustrated as a smartphone or a tablet computer.

In an aspect, the wearable device 110 includes at least one respective internal microphone 112 or 118 adjacent to the speaker 111 or 114. For example, the internal microphone 112 is positioned inside an earcup of the wearable device 110 and next to an internal speaker relative to the earcup. Similarly, the internal microphone 118 is positioned inside a tip or insert of the wearable device 110. The internal microphone 112 or 118 is configured to measure respective audio data associated with the audio signal played by the speaker 111 or 114. The measured audio data may be processed to indicate seal quality between the wearable device 110 and the user's ear (example shown in FIG. 2).

For example, when the wearable device 110 is in the form of a headset, the wearable device 110 may include a flexible seal 113 that conforms to the user's ear and face contour to form a seal between the user's ear and the speaker 111 (and the internal microphone 112). When the wearable device 110 is in the form of earbuds or the like, the wearable device 110 may include a seal 116 in the form of a flexible insert or tip to be inserted into the user's ear, forming a seal against the opening of the ear canal. The speaker 114 and the internal microphone 118 are thus sealed in the space inside the user's ear. As ear sizes and shapes may vary across the population, a single seal may not be ideal for all users. Accordingly, users may prefer various seals 116. When multiple seals 116 are provided to the user as accessories, the user may employ the techniques of feedback disclosed herein to, e.g., identify a seal 116 that delivers the best sound quality achievable by the wearable device 110 while also being comfortable based on their experience of wearing it. The techniques may also be used to help a user balance seal quality with perceived comfort, such that a user may purposefully select an insert/tip and/or fitting that prioritizes one of seal quality or comfort over the other.

In some cases, the wearable device 110 may include voice activity detection (VAD) circuitry capable of detecting the presence of speech signals (e.g. human speech signals) in a sound signal. The wearable device 110 can further include hardware and circuitry including processor(s)/processing system and memory configured to implement one or more sound management capabilities or other capabilities including, but not limited to, noise cancelling circuitry (not shown) and/or noise masking circuitry (not shown), body movement detecting devices/sensors and circuitry (e.g., one or more accelerometers, one or more gyroscopes, one or more magnetometers, etc.), geolocation circuitry and other sound processing circuitry.

In an aspect, the wearable device 110 is wirelessly connected to the playback device 120 using one or more wireless communication methods including, but not limited to, Bluetooth, Wi-Fi, Bluetooth Low Energy (BLE), other RF-based techniques, or the like. In an aspect, the wearable device 110 includes a transceiver that transmits and receives data via one or more antennae in order to exchange audio data and other information with the playback device 120. In some cases, the playback device 120 is configured to receive feedback from the wearable device 110 and may provide visual feedback to the user upon receiving the feedback. In some cases, the playback device 120 may transmit audio signal to the wearable device 110 that converts the audio signal into sound waves for generating the feedback.

In an aspect, the wearable device 110 includes communication circuitry capable of transmitting and receiving audio data and other information from the playback device 120. The wearable device 110 also includes an incoming audio buffer, such as a render buffer, that buffers at least a portion of an incoming audio signal (e.g., audio packets) in order to allow time for retransmissions of any missed or dropped data packets from the playback device 120. For example, when the wearable device 110 receives Bluetooth transmissions from the playback device 120, the communication circuitry typically buffers at least a portion of the incoming audio data in the render buffer before the audio is actually rendered and output as audio to at least one of the transducers (e.g., audio speakers) of the wearable device 110. This is done to ensure that even if there are RF collisions that cause audio packets to be lost during transmission, that there is time for the lost audio packets to be retransmitted by the playback device 120 before they have to be rendered by the wearable device 110 for output by one or more acoustic transducers of the wearable device 110.

The wearable device 110 is illustrated as headphones or earbuds; however, the techniques described herein apply to other wearable audio devices, including any audio output device that at least partially fits around, on, in, or near an ear to create at least a partial seal with the one or both of a user's ears. For instance, this could include an over-ear headset or headphones including earcups that at least partially seal a user's ears, wired or wireless earbuds (e.g., truly wireless earbuds) where each earbud includes an ear tip portion that at least partially seals a user's ears, and so forth. The wearable device 110 may take any form, including standalone devices, stationary devices, headphones, earphones, earpieces, headsets, goggles, headbands, earbuds, sport headphones, neckband, or eyeglasses.

In an aspect, the wearable device 110 is connected to the playback device 120 using a wired connection, with or without a corresponding wireless connection. The playback device 120 can be a smartphone, a tablet computer, a laptop computer, a digital camera, or other playback device that connects with the wearable device 110 in a wired and/or wireless manner. As shown, the playback device 120 can be connected to a network 130 (e.g., the Internet) and can access one or more services over the network. As shown, these services can include one or more cloud services 140.

In an aspect, the playback device 120 can access a cloud server in the cloud 140 over the network 130 using a mobile web browser or a local software application or "app" executed on the playback device 120. In an aspect, the software application or "app" is a local application that is installed and runs locally on the playback device 120. In an aspect, a cloud server accessible on the cloud 140 includes one or more cloud applications that are run on the cloud server. The cloud application can be accessed and run by the playback device 120. For example, the cloud application can generate web pages that are rendered by the mobile web browser on the playback device 120.

In an aspect, a mobile software application installed on the playback device 120 or a cloud application installed on a cloud server, individually or in combination, may be used to implement the techniques for low latency Bluetooth communication between the playback device 120 and the wearable device 110 in accordance with aspects of the present disclosure. In an aspect, examples of the local software application and the cloud application include a gaming application, an audio AR application, and/or a gaming application with audio AR capabilities. The playback device 120 may receive signals (e.g., data and controls) from the wearable device 110 and send signals to the wearable device 110.

Although certain examples herein mention low latency Bluetooth communication between a smartphone and earbuds with flexible tips, any portable playback device and any wireless audio output device having flexible coupling elements can be interchangeably used in these aspects.

Figure 2:
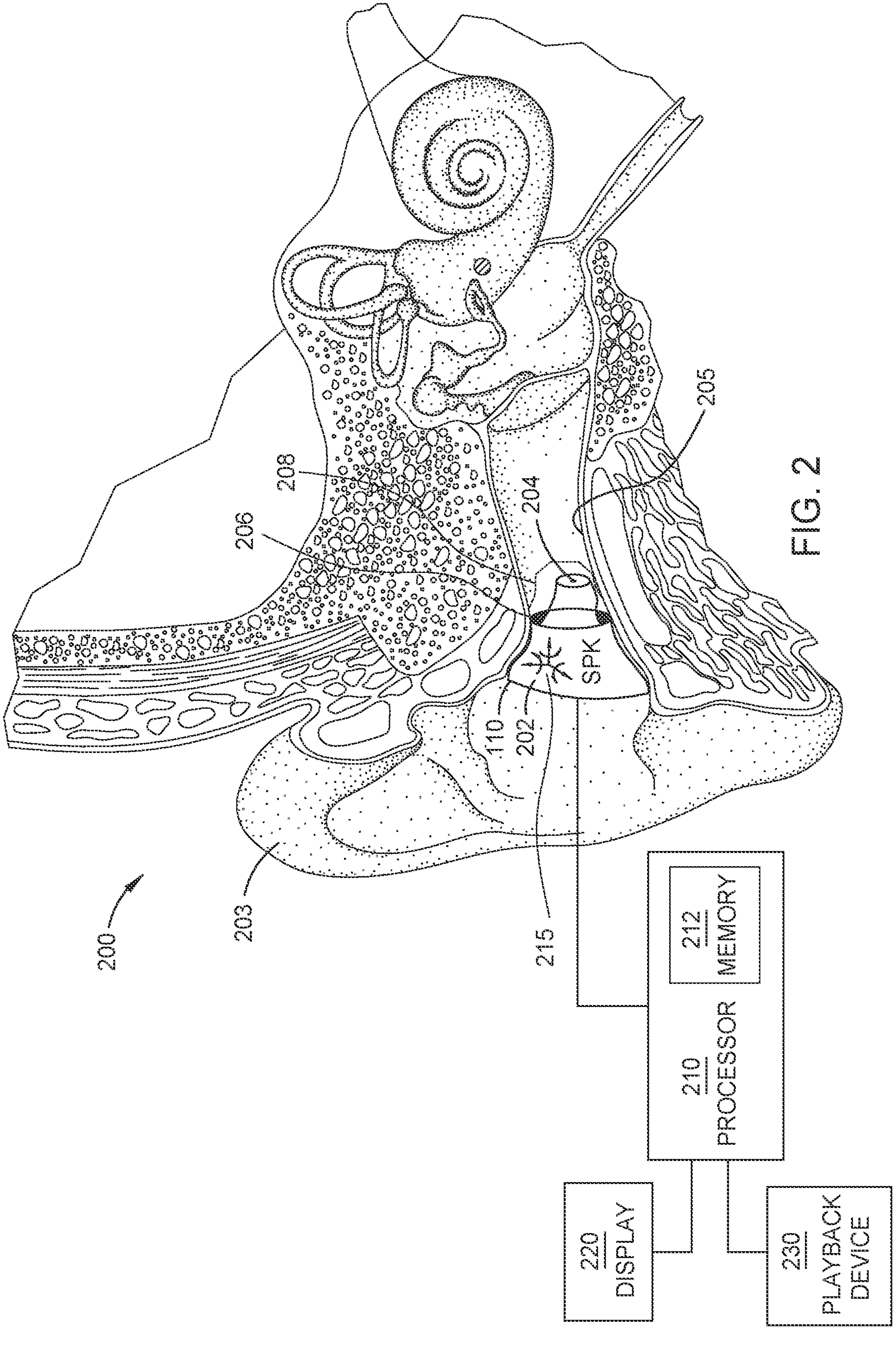
FIG. 2 shows a cross-sectional view illustrating a seal between a speaker and an ear canal, in accordance with certain aspects of the present disclosure.

FIG. 2 shows a cross-sectional view 200 illustrating a seal 206 between a speaker 202 and an ear canal 205, in accordance with certain aspects of the present disclosure. As shown, the wearable device 110 includes the speaker 202 applied with a tip 208. A user may place the tip 208 inside and against the ear canal 205 to form the seal 206. The quality of the seal 206 depends on at least one of (1) the size, shape, material properties, and other aspects of the tip 208, or (2) how well the tip 208 shape conforms to the natural shape of the ear, and (3) the placement in the ear encompassing both an initial position when put on as well as how that position may shift with user movement or activity. The placement 215 includes a position (e.g., translation in a coordinate system) and an orientation (e.g., rotation in the coordinate system) of the flexible coupling element relative to the at least one of the user's ears.

Figure 4:
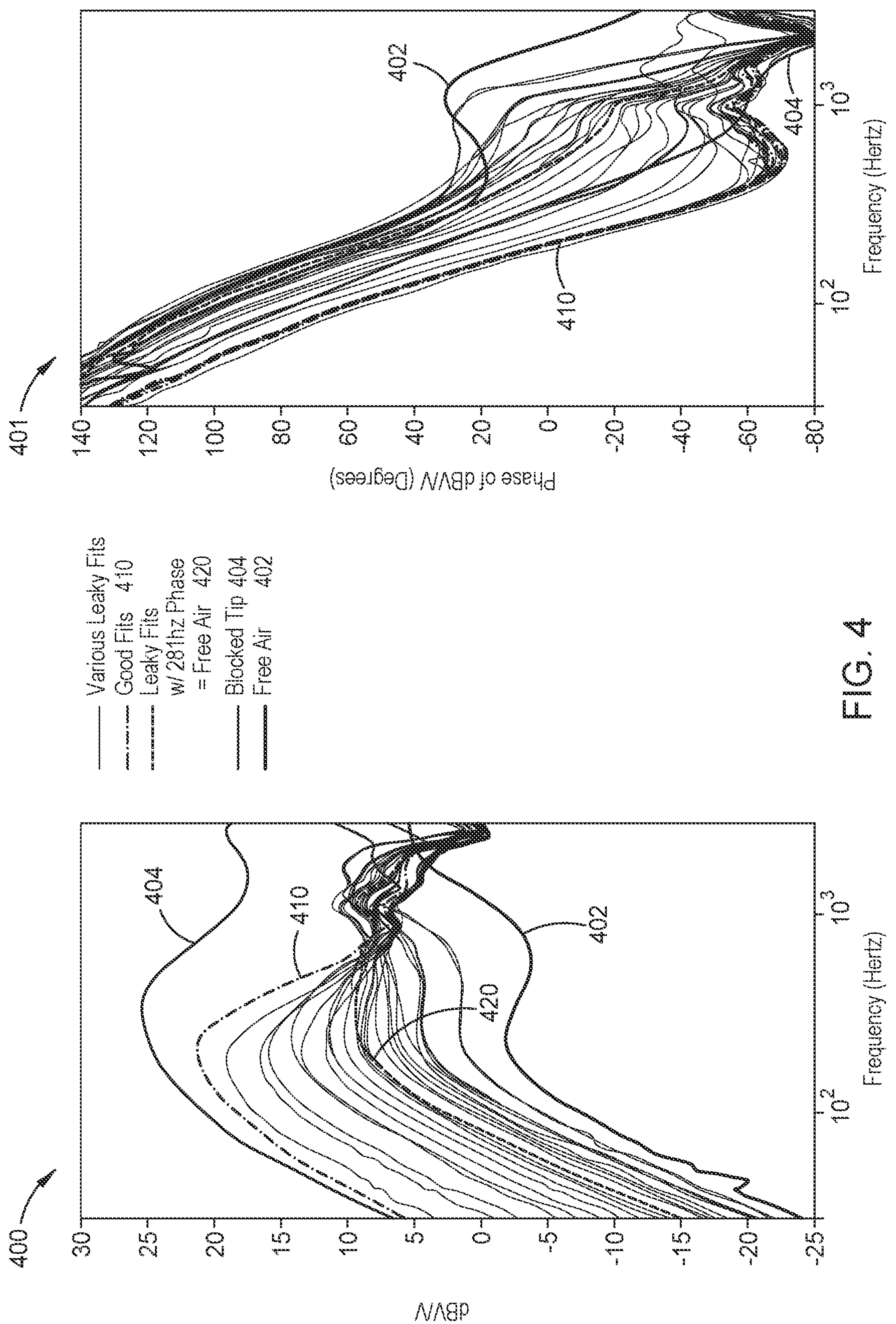
FIG. 4 illustrates example graphs indicating feedback or measurements regarding different seal qualities, in accordance with certain aspects of the present disclosure.

Aspects primarily describe techniques in providing dynamic feedback of the seal quality of the seal 206. The seal quality corresponds to the acoustic performance of the speaker 202 coupled to the enclosed space bounded by the speaker 202, the tip 208, and the ear canal 205. Specifically, the seal quality measures the degree to which low frequency sound emanating from the speaker leaks from that space due to an imperfect seal. The internal microphone 204 may accurately measure various audio waves in the sealed space created between the tip 208 and the ear canal 205. The audio data captured by the internal microphone 204 can be processed to determine a response (e.g., at least a magnitude response or a phase response) in certain frequency ranges (e.g., a low frequency range that is especially responsive to the seal quality, as shown in FIG. 4). In some cases, the response may be interpreted to determine a fit quality index indicative of the level of seal 206 between tip 208 and the ear canal 205. Furthermore, this fit quality index can be divided into one or more calibrated ranges which can be indicated to the user to inform them of the degree of performance they should expect with that tip choice 208 and placement 215.

In some cases, when the wearable device 110 is in the form of headset instead of earbuds, the seal 206 may be created between an earcup (not shown) and the ear 203 while other aspects are similar.

In aspects, the wearable device 110 may provide the feedback as a visual response, such as by outputting the feedback at a display 220. In some cases, the feedback may include an audio response played through the speaker 202 on the wearable device 110. As shown in FIG. 2, the speaker 202 may be coupled with a processor 210, which includes at least one memory 212. The processor 210 may be controlled by a playback device 230, which allows the user to initiate the dynamic feedback generation process. The user may also control the manner for receiving the feedback: visually, audibly, or both, at the playback device 230.

In some cases, the wearable device 110 may include other components not explicitly illustrated in FIG. 2, along with other components shown. For example, the wearable device 110 includes an acoustic driver to transduce audio signals to acoustic energy through the speaker 202. The wearable device 110 also includes a network interface, at least one processor 210, audio hardware, power supplies for powering the various components of the wearable device 110, and memory 212. In an aspect, the processor 210, the network interface, the audio hardware, the power supplies, and the memory 212 are interconnected using various buses, and several of the components can be mounted on a common motherboard or in other manners as appropriate.

The network interface provides for communication between the wearable device 110 and other electronic playback devices via one or more communications protocols. The network interface provides either or both of a wireless network interface and a wired interface 231 (optional). The wireless interface allows the wearable device 110 to communicate wirelessly with other devices in accordance with a wireless communication protocol such as IEEE 802.11. The wired interface 231 provides network interface functions via a wired (e.g., Ethernet) connection for reliability and fast transfer rate, for example, used when the wearable device 110 is not worn by a user.

All other digital audio received as part of network packets may pass straight from the network media processor through a USB bridge (not shown) to the processor 210 and runs into the decoders, DSP, and eventually is played back (rendered) via the electro-acoustic transducer(s).

The network interface can further include a Bluetooth circuitry for Bluetooth applications (e.g., for wireless communication with a Bluetooth enabled audio source such as a smartphone or tablet) or other Bluetooth enabled speaker packages. In some aspects, the Bluetooth circuitry may be the primary network interface due to energy constraints. For example, the network interface may use the Bluetooth circuitry solely for mobile applications when the wearable device 110 adopts any wearable form. For example, BLE technologies may be used in the wearable device 110 to extend battery life, reduce package weight, and provide high quality performance without other backup or alternative network interfaces.

In an aspect, the network interface supports communication with other devices using multiple communication protocols simultaneously at one time. For instance, the wearable device 110 can support Wi-Fi/Bluetooth coexistence and can support simultaneous communication using both Wi-Fi and Bluetooth protocols at one time. For example, the wearable device 110 can receive an audio stream from a smart phone using Bluetooth and can further simultaneously redistribute the audio stream to one or more other devices over Wi-Fi. In an aspect, the network interface may include only one RF chain capable of communicating using only one communication method (e.g., Wi-Fi or Bluetooth) at one time. In this context, the network interface may simultaneously support Wi-Fi and Bluetooth communications by time-sharing the single RF chain between Wi-Fi and Bluetooth, for example, according to a time division multiplexing (TDM) pattern.

Streamed data may pass from the network interface to the processor 210. The processor 210 can execute instructions (e.g., for performing, among other things, digital signal processing, decoding, and equalization functions), including instructions stored in the memory 212. The processor 210 can be implemented as a chipset of chips that includes separate and multiple analog and digital processors. The processor 210 can provide, for example, for coordination of other components of the audio wearable device 110, such as control of user interfaces.

In certain aspects, the memory 212 stores software/firmware related to protocols and versions thereof used by the wearable device 110 for communicating with other networked devices. For example, the software/firmware governs how the wearable device 110 communicates with other devices for synchronized playback of audio. In an aspect, the software/firmware includes lower level frame protocols related to control path management and audio path management. The protocols related to control path management generally include protocols used for exchanging messages between speakers. The protocols related to audio path management generally include protocols used for clock synchronization, audio distribution/frame synchronization, audio decoder/time alignment and playback of an audio stream. In an aspect, the memory can also store various codecs supported by the speaker package for audio playback of respective media formats. In an aspect, the software/firmware stored in the memory can be accessible and executable by the processor 210 for synchronized playback of audio with other networked speaker packages.

In certain aspects, the protocols stored in the memory 212 may include BLE according to, for example, the Bluetooth Core Specification Version 5.2 (BT5.2). The wearable device 110 and the various components therein are provided herein to sufficiently comply with or perform aspects of the protocols and the associated specifications. For example, BT5.2 includes enhanced attribute protocol (EATT) that supports concurrent transactions. A new L2CAP mode is defined to support EATT. As such, the wearable device 110 includes hardware and software components sufficiently to support the specifications and modes of operations of BT5.2, even if not expressly illustrated or discussed in this disclosure. For example, the wearable device 110 may utilize LE Isochronous Channels specified in BT5.2.

The processor 210 provides a processed digital audio signal to the audio hardware which includes one or more digital-to-analog (D/A) converters for converting the digital audio signal to an analog audio signal. The audio hardware also includes one or more amplifiers which provide amplified analog audio signals to the electroacoustic transducer(s) for sound output. In addition, the audio hardware can include circuitry for processing analog input signals to provide digital audio signals for sharing with other devices, for example, other speaker packages for synchronized output of the digital audio.

The memory 212 may be any nonvolatile or non-transitory memory device. The memory 212 can include, for example, flash memory and/or non-volatile random access memory (NVRAM). In some aspects, instructions (e.g., software) are stored in an information carrier. The instructions, when executed by one or more processing devices (e.g., the processor 210), perform one or more processes, such as those described elsewhere herein. The instructions can also be stored by one or more storage devices, such as one or more computer or machine-readable mediums (for example, the memory 212, or memory on the processor). The instructions can include instructions for performing decoding (i.e., the software modules include the audio codecs for decoding the digital audio streams), as well as digital signal processing and equalization. In certain aspects, the memory 212 and the processor 210 may collaborate in data acquisition and real time processing with the internal microphone 204.

Figure 3:
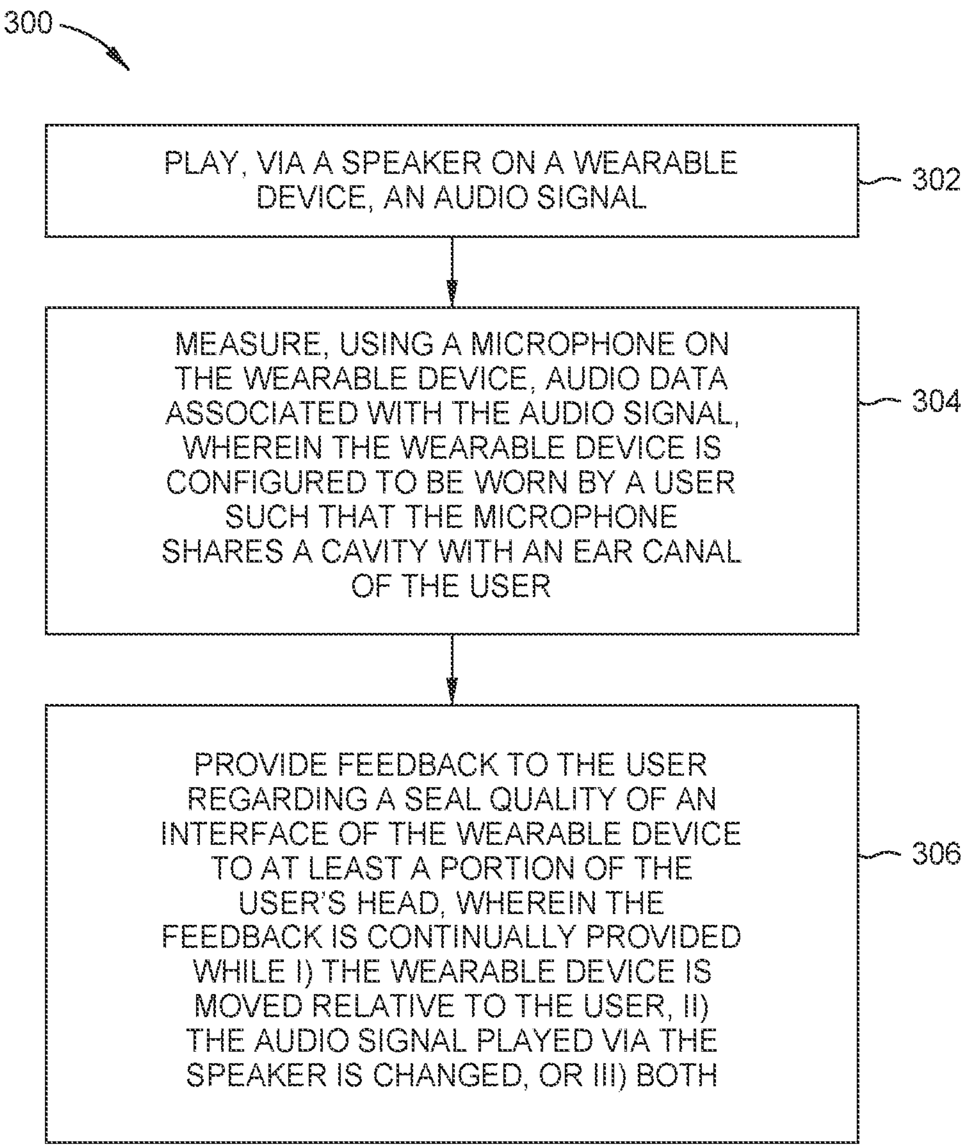
FIG. 3 is a flow diagram illustrating example operations that may be performed by a playback device, in accordance with certain aspects of the present disclosure.

FIG. 3 is a flow diagram illustrating example operations 300 that may be performed by a wearable device in accordance with aspects of the present disclosure. For example, the example operations 300 may be performed by the wearable device 110 of FIGS. 1 and 2 to provide dynamic feedback to the user.

The example operations 300 begin, at 302, by playing, via a speaker on the wearable device, an audio signal. At 304, the wearable device measures, using a microphone on the wearable device, audio data associated with the audio signal. The wearable device is configured to be worn by a user such that the microphone shares a cavity with an ear canal of the user.

At 306, the wearable device provides the feedback to the user regarding a seal quality of an interface of the wearable device to at least a portion of the user's head. The feedback is continually provided while i) the wearable device is moved relative to the user, ii) the audio signal played via the speaker is changed, or iii) both.

In some cases, the feedback dynamically changes based, at least in part, on the audio data and the interface of the wearable device to the at least one of the user's ears as determined by at least one of an application of a flexible coupling element for the wearable device or a placement of the flexible sealing tip in the at least one of the user's ear. In aspects, the feedback includes a visual response, an audio response, or both. For example, the visual response may include displaying, on a display of the wearable device or of another device connected to the wearable device (e.g., the playback device 120 of FIG. 1), a determination of the seal quality. The feedback may be descriptive with respect to a rating, such as excellent, decent, adequate, or poor. Such descriptive feedback may be represented by different tones in the audio response, and/or different colors, icons, or characters in the visual response. The feedback may be quantitative, such as providing a score or a quantified result (e.g., a graphic representation of amplitude or phase response).

In aspects, the placement of the flexible coupling element relative to the ear includes at least a position or an orientation of the flexible coupling element relative to the at least one of the user's ears. In some case, the speaker on the wearable device and the internal microphone are placed inside the ear of the user. The audio data measured by the internal microphone may include a low frequency response indicating a level of seal between the speaker and the ear of the user, wherein the low frequency response includes at least one of a magnitude response or a phase response. In some cases, both magnitude and phase responses may be used to determine a level of seal. In some cases, one of the magnitude and phase responses may be used.

In some cases, the method further includes indicating a fit quality index when the level of seal between the speaker and the ear of the user is within one of one or more calibrated ranges used to communicate to the user (e.g., corresponding to a "bad fit" or an "okay fit" or a "great fit"). In some cases, the method further includes actively canceling, via the speaker, ambient noises when the fit quality index is above a threshold value.

In aspects, the method further includes generating the audio signal based on a profile of frequency variations to invoke the low frequency response.

In aspects, the audio data measured by the internal microphone includes a low frequency response indicating a level of seal between the speaker and the ear of the user. Examples of frequency responses are illustrated in FIG. 4 and discussed below.

FIG. 4 illustrates example graphs 400 and 401 indicating feedback or measurements regarding different seal qualities, in accordance with certain aspects of the present disclosure. In the illustrative examples, the different seal qualities are provided using various flexible tips on earbuds forming a seal with a user's ear. On the left, magnitude or amplitude responses in the vertical axis are plotted against frequency in the logarithmic horizontal axis. On the right, phase responses (in the vertical axis) are plotted against the frequency in the logarithmic horizontal axis. As shown, the plots of the complex response from the driver to a feedback (system) microphone complex response (magnitude in dB, phase in degrees) illustrates different results created by different seal qualities. The example measurements are conducted at a test frequency of about 281 Hz (while other frequencies may also be used to provide the feedback).

Achieving a good seal is critical in delivering both the passive and active performance. The noise canceling earbud described herein identifying and helping place a flexible coupling element, such as the soft tip of the earbud. The present disclosure provides quantified feedback to enable the user to learn about the better performance achievable by the earbud when a tip whose size or shape is well-matched to the the shape of their ear is used and the earbud with tip is properly positioned. As shown, the low-frequency driver-to-feedback-microphone response of the earbud (e.g., a noise-canceling earbud fitted with various tips) varies significantly with the seal qualities. Among the multiple recorded data sets, four primary representative lines are shown: (1) a lower reference line 402 when the earbud and its tip is in free air (i.e., not inserted into the user's ear); (2) an upper reference line 404 when the tip of the earbud has been blocked; (3) a representative good fit line 410 when the tip forms an expected seal quality with the user's ear that enables excellent noise cancellation and audio performance; and (4) a representative faulty fit line 420 averaging cases when the tip of the earbud fails to form a good seal with the user's ear.

Using these four representation lines, different seal qualities may be indicated when the response falls in a zone bounded by consecutive lines. As such, the seal qualities may be represented by a fit quality index. For example, if a measured response is between the low reference line 402 and the faulty fit line 420, a visual feedback (e.g., as an icon, color, notification, etc.) and/or an audio feedback (e.g., a tone, recording, etc.) indicating a poor fit (i.e., a fit quality index of bad seal qualities) may be provided, such as in the wearable device 110 and/or the playback device 120. If a measured response is between the faulty fit line 420 and the good fit line 410, or approximate to the good fit line 410 within certain defined tolerance, a visual feedback and/or an audio feedback indicating an acceptable fit (i.e., a fit quality index of adequate seal qualities) may be provided. If a measured response is between the good fit line 410 and the upper reference line 404, a visual feedback and/or an audio feedback indicating an excellent fit (i.e., a fit quality index of good seal qualities) may be provided.

In aspects, the dynamic feedback provided to the user includes a clear and simple auditory and/or visual display of the quality of the seal. The feedback updates in near real-time as a user move the earbud (or the wearable device in another form) relative to the user's ear (e.g., depth of insertion, rotation, etc.). The visual feedback display(s) may also have a clear indication of what is good, design-intent performance. In some cases, the visual display can be a simple meter or bar graph. The auditory feedback can be a sequence of chords played relative to the earbud, each associated with a range of seal quality. The sequence of chords may form a clear progression to a resolution. For example, the bad fit chord may be dissonant, or may sound like an orchestra tuning with more instruments appearing as fit quality improves. Furthermore, the complexity of instrumentation in the sound can change, as can the repetition rate of aspects of the sound. For example, the user might hear this progression through three fit quality ranges as they are slowly put on and move an earbud into a good position, with a well-chosen tip that achieves a good seal.

In some cases, the audio feedback may be from a multi-media recording (e.g., a video, a presentation, or a document with audio aspects recorded). The multi-media recording may be displayed as or along with an application with the audio feedback played. The multi-media recording may simultaneously provide one or more visual cues to prompt certain manipulation of the tip, such as while the audio feedback is played alongside.

In some cases, the combination of both visual feedback (e.g., in an application of the playback device 120, communicating with the wearable device 110 via Bluetooth) and an audio feedback in the wearable device 110 directly may best inform the user regarding the exact performance of the wearable device 110. The visual and audible feedback may be coordinated so as to reinforce the meaning, such as a one-, two- or three-bar display (like a cellular signal strength meter) corresponding to a three-step progression of sounds.

Figure 5:
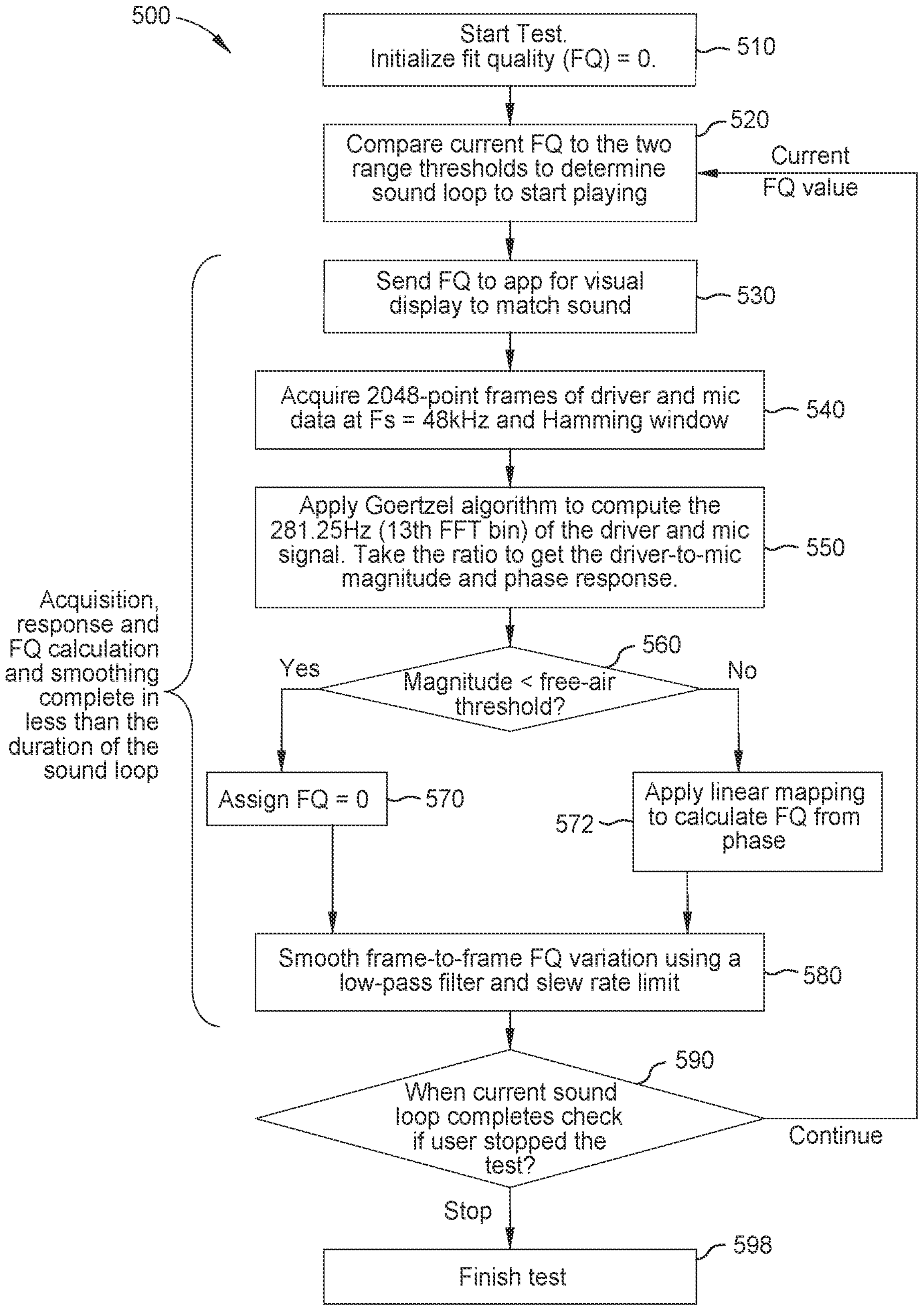
FIG. 5 illustrates an example flow diagram for providing continual feedback, in accordance with certain aspects of the present disclosure.

FIG. 5 illustrates an example flow diagram 500 for providing continual feedback of a fit quality (FQ), in accordance with certain aspects of the present disclosure. As shown, at 510, the wearable device may initialize the FQ value to be zero. At 520, a current FQ value is measured or identified and compared with two range thresholds to determine a sound loop for playing. For example, the current FQ value may be fed back to replace the initialized FQ value and updated for each execution cycle.

At 530, the current FQ value is sent to an application for visual display. The visual display may match a sound recording being played, such as a testing sound sequence for determining the FQ value.

At 540, the wearable device may acquire 2048-point frames of driver and microphone data at 48 kHz (or another frequency). The frames correspond to a Hamming window (such as, for example, an extension of the Hann window having a raised cosine window form and a corresponding spectrum form).

At 550, the wearable device applies the Goertzel algorithm to compute signals at the test frequency, such as 281.25 Hz ($13^{th}$ FFT bin) of the driver and microphone signals. The driver-to-mic magnitude ratio is computed, along with the corresponding phase response.

At 560, the driver-to-mic magnitude is compared with a free-air threshold that is measured when air may freely enter or exit the cavity formed by the wearable device and the ear. If the magnitude is less than the free-air threshold, then the FQ is assigned to be zero at 570. Otherwise, at 572, the wearable device applies a linear mapping to calculate FQ from phase.

At 580, the frame-to-frame FQ value variation is smoothed using a low-pass filter and slew rate limit. At 590, when the current sound loop completes, a checking step is performed to determine whether the user has stopped the test. For example, the user may stop the test by interacting with the wearable device or an application running on a user device. The test may also be stopped using a timer. If the user has not stopped the test, the test continues by looping back to 520. If the user has stopped the test, the testing sequence then finishes at 590.

In other aspects, the disclosed methods are applicable to wireless earbuds, earhooks, or ear-to-ear devices. For example, a host like a mobile phone may be connected over Bluetooth to a bud (e.g., right side) and that right-side bud further connects to the left-side bud using either a Bluetooth link or using other wireless technologies like NFMI or NFEMI. The left-side bud is first time-synchronized with the right-side bud. Audio frames (compressed in mono) are sent from the left-side bud with its timestamp (which is synchronized with the right bud's timestamp) as described in the technology above. The right bud will forward these encoded mono frames along with its own frames. The right bud will not wait for an audio frame from the left bud with the same timestamp. Instead, the right-bud sends whatever frame is available and ready to be sent with suitable packing. It is the responsibility of the receiving application in the host to assemble the packets using the timestamp and the channel number. The receiving application, depending upon how it is configured, can choose to merge the decoded mono channel of one bud and a decoded mono channel of the other bud into a stereo track based on the timestamp included in the header of the received encoded frames. The present disclosure allows the right-side bud to simply forward the audio frames from the left-side bud without decoding the frame. This helps to conserve battery power in truly wearable devices.

It can be noted that, descriptions of aspects of the present disclosure are presented above for purposes of illustration, but aspects of the present disclosure are not intended to be limited to any of the disclosed aspects. Many modifications and variations will be apparent to those of ordinary skill in the art without departing from the scope and spirit of the described aspects.

In the preceding, reference is made to aspects presented in this disclosure. However, the scope of the present disclosure is not limited to specific described aspects. Aspects of the present disclosure can take the form of an entirely hardware aspect, an entirely software aspect (including firmware, resident software, micro-code, etc.) or an aspect combining software and hardware aspects that can all generally be referred to herein as a "component," "circuit," "module" or "system." Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium can be any tangible medium that can contain, or store a program.

The flowchart and block diagrams in the Figures illustrate the architecture, functionality and operation of possible implementations of systems, methods and computer program products according to various aspects. In this regard, each block in the flowchart or block diagrams can represent a module, segment or portion of code, which comprises one or more executable instructions for implementing the specified logical function(s). In some alternative implementations the functions noted in the block can occur out of the order noted in the figures. For example, two blocks shown in succession can, in fact, be executed substantially concurrently, or the blocks can sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

What is claimed is:

1. A method for providing feedback on seal quality of a wearable device, the method comprising:

playing, via a speaker on the wearable device, an audio signal;

measuring, using a microphone on the wearable device, audio data associated with the audio signal, wherein the wearable device is configured to be worn by a user such that the microphone shares a cavity with an ear canal of the user; and providing feedback to the user regarding a seal quality of an interface of the wearable device to at least a portion of the user's head while the wearable device includes a first flexible coupling element, the seal quality depending on a placement of the first flexible coupling element relative to the portion of the user's head both in an initial position when put on and a shifted position due to movement of activity of the user, wherein:

the feedback updates in near real-time as the user moves the wearable device relative to the user's ear, the feedback comprises a quantitative graphical representation of amplitude or phase response displayed to the user, and the feedback is calculated, at least in part, on 2048-point frames of a driver of the wearable device and microphone data at a set frequency, wherein the frames correspond to a Hamming window and the driver to microphone magnitude is compared with a free-air threshold to determine a fit quality of the wearable device.

2. The method of claim 1, wherein providing the feedback comprises providing a visual response via a remote device connected to the wearable device.

3. The method of claim 1, wherein providing the feedback comprises providing an audio response via the speaker on the wearable device.

4. The method of claim 1, wherein the speaker on the wearable device and the microphone are placed inside the ear of the user.

5. The method of claim 4, wherein the audio data measured by the microphone comprises a low frequency response indicating a level of seal between the speaker and the ear of the user, wherein the low frequency response comprises at least one of a magnitude response or a phase response.

6. The method of claim 5, further comprising indicating a fit quality index when the seal quality is within one of multiple different ranges.

7. The method of claim 6, further comprising, in response to the fit quality index being above a threshold value, initiating active noise canceling using the speaker.

8. The method of claim 5, further comprising generating the audio signal based on a profile of frequency variations with respect to the seal quality of the wearable device to invoke the low frequency response.

9. The method of claim 1, wherein the microphone is a microphone used for active noise cancelation.

10. The method of claim 1, wherein the at least a portion of the user's head includes a user's ear.

11. The method of claim 1, wherein the feedback dynamically changes based, at least in part, on the audio data and the interface of the wearable device to the at least one of the user's ears as determined by at least one of an application of the first flexible coupling element or a second flexible coupling element for the wearable device or a placement of the first flexible coupling element or the second flexible coupling element relative to the at least one of the user's ear, wherein the placement of the first flexible coupling element or the second flexible coupling element relative to the ear includes at least a position or an orientation of the first flexible coupling element or the second flexible coupling element relative to the at least one of the user's ears.

12. The method of claim 1, wherein when the driver to microphone magnitude is less than the free-air threshold, the fit quality is assigned to be zero, and wherein when the driver to microphone magnitude is greater than the free-air threshold, a linear mapping is applied to calculate the fit quality from phase.

13. A wearable device configured to be worn by a user such that a microphone of the wearable device shares a cavity with an ear canal of the user, the wearable device comprising:

at least one speaker configured to play an audio signal to the user;

the microphone adjacent to the at least one speaker, the microphone configured to measure audio data associated with the audio signal played by the at least one speaker; and a processor configured to:

process the audio data to dynamically determine, in a closed-loop, a feedback regarding a seal quality of an interface of the wearable device to at least one of the user's ears while the wearable device includes a first flexible coupling element, the seal quality depending on a placement of the first flexible coupling element relative to the portion of the user's head both in an initial position when put on and a shifted position due to movement of activity of the user, wherein:

the feedback updates in near real-time as the user moves the wearable device relative to the user's ear, the feedback comprises a quantitative graphical representation of amplitude or phase response displayed to the user, and the feedback is calculated, at least in part, on 2048-point frames of a driver of the wearable device and microphone data at a set frequency, wherein the frames correspond to a Hamming window and the driver to microphone magnitude is compared with a free-air threshold to determine a fit quality of the wearable device; and output the feedback to the user.

14. The wearable device of claim 13, further comprising a visual indicator configured to provide a visual indication of the feedback to the user.

15. The wearable device of claim 13, wherein the feedback is at least played by the at least one speaker.

16. The wearable device of claim 13, wherein a movement of the wearable device includes at least a position or an orientation of the wearable device relative to the at least one of the user's ears.

17. The wearable device of claim 16, wherein the speaker on the wearable device and the microphone are placed inside the ear of the user.

18. The wearable device of claim 17, wherein the audio data measured by the microphone comprises a low frequency response indicating a level of seal between the speaker and the ear of the user, wherein the low frequency response comprises at least one of a magnitude response or a phase response.

19. The wearable device of claim 18, wherein the feedback comprises a fit quality index indicating when the level of seal between the speaker and the ear of the user is within a calibrated range.

20. A system comprising:

a wearable device comprising:

at least one speaker configured to play an audio signal to a user;

a microphone adjacent to the at least one speaker, the microphone configured to measure audio data associated with the audio signal played by the at least one speaker; and a processor configured to:

process the audio data to dynamically determine, in a closed-loop, a feedback regarding a seal quality of an interface of the wearable device to at least one of the user's ears while the wearable device includes a first flexible coupling element, the seal quality depending on a placement of the first flexible coupling element relative to the portion of the user's head both in an initial position when put on and a shifted position due to movement of activity of the user, wherein:

the feedback updates in near real-time as the user moves the wearable device relative to the user's ear, the feedback comprises a quantitative graphical representation of amplitude or phase response displayed to the user, and the feedback is calculated, at least in part, on 2048-point frames of a driver of the wearable device and microphone data at a set frequency, wherein the frames correspond to a Hamming window and the driver to microphone magnitude is compared with a free-air threshold to determine a fit quality of the wearable device; and output the feedback to the user; and a playback device in communication with the wearable device, the playback device configured to receive the feedback.

21. The system of claim 20, wherein the playback device transmits the audio signal to the wearable device.

* * * * *